(12) United States Patent
Bansal et al.

(10) Patent No.: US 11,179,631 B2
(45) Date of Patent: Nov. 23, 2021

(54) PROVIDING VIDEO GAME CONTENT TO AN ONLINE CONNECTED GAME

(71) Applicant: Electronic Arts Inc., Redwood City, CA (US)

(72) Inventors: Tushar Bansal, San Francisco, CA (US); Reza Pourabolghasem, San Mateo, CA (US); Sundeep Narravula, Saratoga, CA (US); Navid Aghdaie, San Jose, CA (US); Kazi Zaman, Foster City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 16/822,706

(22) Filed: Mar. 18, 2020

(65) Prior Publication Data

US 2021/0291046 A1    Sep. 23, 2021

(51) Int. Cl.
*A63F 13/35* (2014.01)
*A63F 13/67* (2014.01)

(52) U.S. Cl.
CPC .............. *A63F 13/35* (2014.09); *A63F 13/67* (2014.09)

(58) Field of Classification Search
None
See application file for complete search history.

(56) References Cited

U.S. PATENT DOCUMENTS

| | | | |
|---|---|---|---|
| 10,905,962 B2 * | 2/2021 | Kaethler | .................. G06N 3/08 |
| 2019/0244137 A1 * | 8/2019 | Malan | ..................... G06N 3/084 |
| 2020/0078688 A1 * | 3/2020 | Kaethler | ................ A63F 13/67 |
| 2020/0289943 A1 * | 9/2020 | Rico | ..................... A63F 13/795 |

\* cited by examiner

*Primary Examiner* — Ronald Laneau
(74) *Attorney, Agent, or Firm* — Middleton Reutlinger (57) ABSTRACT

A computer-implemented method for providing video game content is provided. The method comprises monitoring a request rate of requests to provide video game content; and in response to the request rate exceeding a threshold request rate: initialising at least one instance of a first machine learning model, wherein the first machine learning model is configured to provide an output which is approximate to the output of a second machine learning model from which the first machine learning model is derived, the first machine learning model being produced by a model derivation process to have a faster response time compared to the second machine learning model; and providing video game content, wherein providing the video game content comprises generating an output responsive to the specified input using the at least one instance of the first machine learning model.

19 Claims, 5 Drawing Sheets

PROVIDING VIDEO GAME CONTENT TO AN ONLINE CONNECTED GAME

BACKGROUND

Machine learning techniques and models have found application in a variety of technical fields. In recent times, there has been increasing interest in the use of machine learning in the field of video games.

SUMMARY

In accordance with a first aspect, the specification describes a computer-implemented method for providing video game content to an online connected game. The method includes: monitoring a request rate of requests to provide video game content based on specified input; and, in response to the request rate exceeding a threshold request rate, initialising at least one instance of a first machine learning model and providing video game content to at least one of the plurality of instances of the online connected game. The requests are received from a plurality of instances of the online connected game. The first machine learning model is configured to provide an output which is approximate to the output of a second machine learning model from which the first machine learning model is derived, the first machine learning model being produced by a model derivation process to have a faster response time compared to the second machine learning model. Providing the video game content includes generating an output responsive to the specified input using the at least one instance of the first machine learning model.

In accordance with a second aspect, the specification describes a distributed computing system for providing video game content to an online connected game. The distributed computing system includes a plurality of servers. The distributed computing system is configured to monitor a request rate of requests to provide video game content based on specified input; and, in response to the request rate exceeding a threshold request rate, initialise at least one instance of a first machine learning model and provide video game content to at least one of the plurality of instances of the online connected game. The requests are received from a plurality of instances of the online connected game. The first machine learning model is configured to provide an output which is approximate to the output of a second machine learning model from which the first machine learning model is derived, the first machine learning model being produced by a model derivation process to have a faster response time compared to the second machine learning model. Providing the video game content includes generating an output responsive to the specified input using the at least one instance of the first machine learning model.

In accordance with a third aspect, the specification describes one or more non-transitory computer readable media storing computer program code. When executed by one or more processing devices, the computer program code causes the one or more processing devices to perform operations including monitoring a request rate of requests to provide video game content based on specified input; and, in response to the request rate exceeding a threshold request rate, initialising at least one instance of a first machine learning model and providing video game content to at least one of the plurality of instances of the online connected game. The requests are received from a plurality of instances of the online connected game. The first machine learning model is configured to provide an output which is approximate to the output of a second machine learning model from which the first machine learning model is derived, the first machine learning model being produced by a model derivation process to have a faster response time compared to the second machine learning model. Providing the video game content includes generating an output responsive to the specified input using the at least one instance of the first machine learning model.

BRIEF DESCRIPTION OF THE DRAWINGS

Certain embodiments of the present invention will now be described, by way of example, with reference to the following figures.

DETAILED DESCRIPTION

Using machine learning models may improve the quality of provided video game content as measured using one or more of objective content quality measures, assessments and feedback from video game players. Examples of video game content that may be provided include, but are not limited to, speech audio; player character choice recommendations; game mode recommendations; the location of entities, e.g. objects, characters and resources, within a video game environment; music; non-player character behaviour; character animations; and video game terrain. The content provided by machine learning models may also be dynamic facilitating varied player experiences, e.g. every playthrough of a video game may be different.

Machine learning models may additionally or alternatively be used to facilitate video game accessibility. For example, machine learning models may be used for generating speech audio from text displayed by a video game, e.g. the text of a video game menu, which may facilitate the playing of the video game by a person having a visual impairment.

However, a drawback of providing video game content using machine learning models is that machine learning models may use significantly more computational resources, e.g. memory, processing resource, and storage space, than other methods of providing video game content, e.g. providing static or scripted content. As the provisioning and utilization of computational resources takes time, the time taken to provide video game content in response to a request, e.g. the video game content provision latency, may also be increased relative to other methods of providing video game content. These problems may be exacerbated where there a large number of requests to provide video game content as, even in cloud computing systems, where hardware resources may be dynamically allocated and additional instances of machine learning models initialized, e.g. scaled up, the dynamic allocation of such resources in itself takes time. Alternatively or additionally, where there are a high number of requests to provide video game content using machine learning models, these requests may be queued such that the request is not processed using a machine learning model instance until processing of previous requests completes further increasing the response time. Therefore, systems and methods for facilitating the use of machine learning models to provide high quality video game content while addressing these challenges.

In accordance with various example implementations, methods and systems for providing video game content to instances of an online connected game using a plurality of machine learning models are described.

The video game content is provided in response to requests for video game content from a plurality of instances of the online connected game. The plurality of machine learning models include at least a principal machine learning model and a derived machine learning model. The derived machine learning model provides outputs that approximate the outputs of the principal machine learning model. The video game content provided using the derived machine learning model may of a lower quality than video game content provided using the principal machine learning model but the derived machine learning model may use fewer computational resources and/or have a faster response time. The plurality of machine learning models may additionally include one or more further derived machine learning models that use fewer computational resources and/or have faster response times than the derived machine learning model. The video game content provided using these one or more further derived machine learning models may be of a lower quality than that provided using the derived machine learning models. The derived machine learning models may be or have been derived from the principal machine learning model using a suitable machine learning model derivation method as will be described below. The further derived machine learning model(s) may have been derived using similar processes from the principal machine learning model and/or the derived machine learning model.

This plurality of machine learning models may be used to provide video game content as follows. The rate of requests to provide video game content is monitored. If the rate of requests is less than or equal to a threshold request rate then the principal machine learning model is used. The video game content provided using the principal machine learning model is of the highest quality and, when the rate of requests is below the threshold request rate, the time taken to provide video game content using the principal machine learning model is tolerable because, for example, there are no or a sufficiently small number of queued requests; computational resources are or can be made available to the machine learning model such that it can be used to provide video game content sufficiently quickly; and/or if more instances of the principal machine learning model are to be initialized, these instances of the principal machine learning model may be initialized sufficiently quickly. If the rate of requests exceeds a threshold request rate then in various examples instance(s) of the derived machine learning model are initialized and used to provide video game content. In some examples, instance(s) of a further derived machine learning model may be initialized and used to provide video game content in response to the request rate exceeding another greater threshold.

Using the described systems and methods, the time taken and/or the amount of computational resources used to provide video game content using machine learning models may be reduced or kept within tolerable bounds, while also facilitating the provision of higher quality video game content using machine learning models when resources permit, e.g. when there are fewer requests.

Video Game Content Provision System

Figure 1:
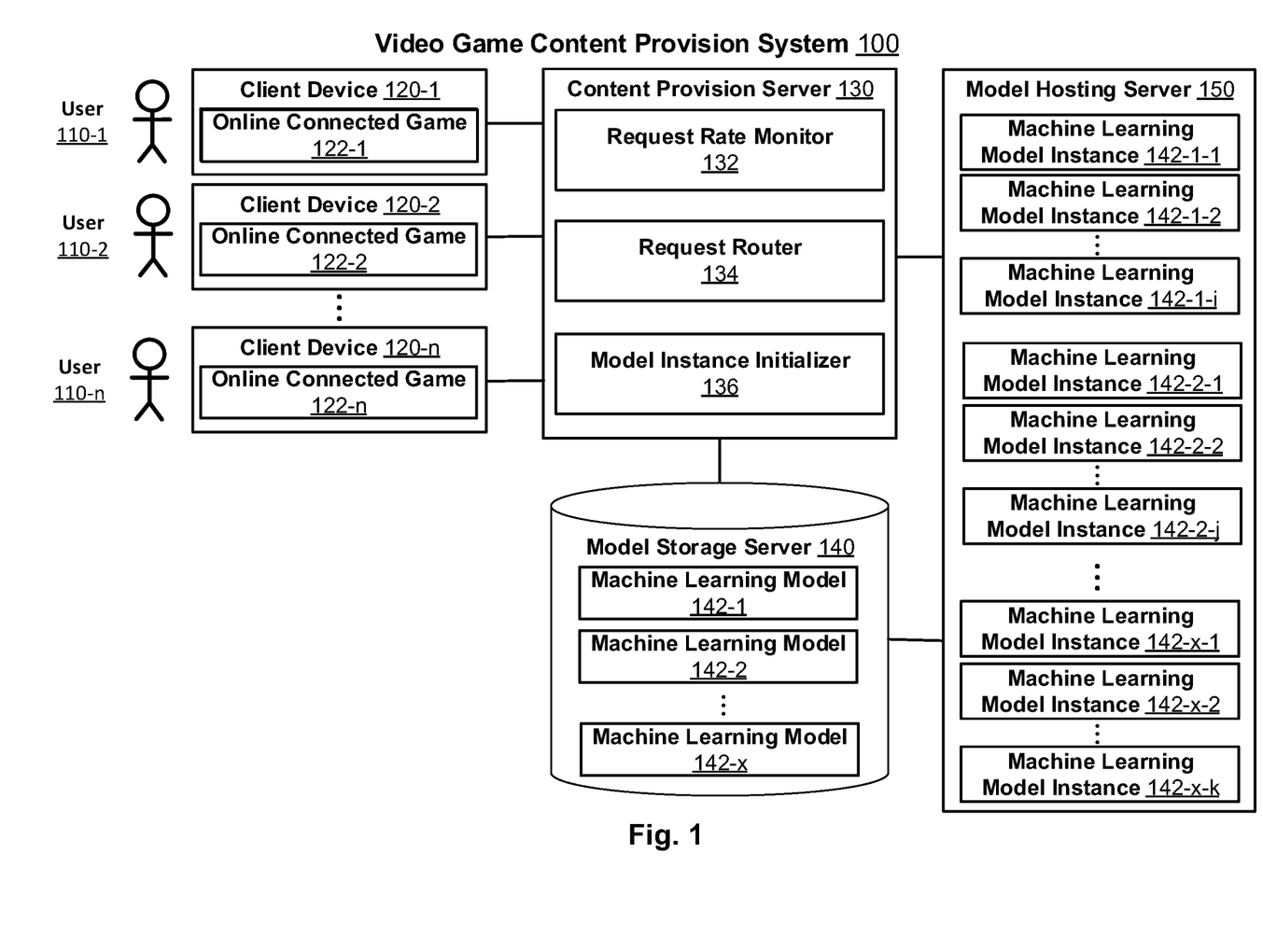
FIG. 1 is a schematic block diagram illustrating an example of a computer system configured to provide video game content to an online connected game using one or more derived machine learning models.

Referring to FIG. 1, a video game content provision system 100 for providing video game content to an online connected game using one or more derived machine learning models is shown.

The video game content provision system 100 includes client computing devices 120-1, 120-2, . . . , 120-n operable by respective users 110-1, 110-2, . . . , 110-n, content provision server 130, model storage server 140, and model hosting server 150. The client computing devices 120 are configured to communicate with the content provision server 130 over a network. Similarly, the content provision server 130 is configured to communicate with the model hosting server 150 over the same or another network. The content provision server 130 is also configured to communicate with the model storage server 150 over the same or another network. The model hosting server may 150 may be configured to communicate with the model storage server 140. Examples of suitable networks include the internet, intranets, virtual private networks, local area networks, private wide area networks, wireless networks and cellular networks. For the sake of clarity, the video game content provision system 100 is illustrated as comprising a specific number of devices. Any of the functionality described as being performed by a specific device may instead be performed across a number of computing devices, and/or functionality described as being performed by multiple devices may be performed on a single device. For example, multiple instances of the content provision server 130, the model hosting server 150, and/or model storage server 140 may be hosted as virtual machines or containers on one or more computing devices of a public or private cloud computing environment.

The client computing devices 120-1, 120-2, . . . , 120-n can be any computing devices suitable for providing instances of an online connected game 122-1, 122-2, . . . , 122-n to the respective users 110-1, 110-2, . . . , 110-n. For example, the client computing devices 120 may be any of a video games console, a desktop computer, a laptop computer, a tablet computer, or a smartphone. The client computing devices 120 may be of the same type, e.g. all of the client computing devices 120 may be video games console, or they may be of different types, e.g. some of the client computing devices 120 may be video games consoles and others of the client computing devices may be desktop computers. For displaying the online connected game 122 to the user 110, each client computing device 120 includes or is connected to a display (not shown). Input device(s) (not shown) are also included or connected to each of the client computing devices. Examples of suitable input devices include keyboards, touchscreens, mice, video game controllers, microphones and cameras.

The client computing devices 120-1, 120-2, . . . , 120-n provides respective instances of the online connected game 122-1, 122-2, . . . , 122-n to the respective users 110-1, 110-2, . . . , 110-n. The online connected game may be an online multiplayer game. For example, the online connected game may be a battle royale game, a massively multiplayer online role playing game, a multiplayer first person shooter, an online open world game, or a multiplayer racing game.

The online connected game may be a video game including both a single player component and an online multiplayer component, e.g. a role playing game, a first person shooter game, a racing game, a sports video game, such as a football video game or an ice hockey video game, or a strategy game. The online connected game may also be a single player game configured to receive video game content via the internet. For example, the game may be an action game, an adventure game, a puzzle game, a platformer or a roleplaying game that utilizes the received video game content to vary and/or enhance players' experiences.

The instances of the online connected game 122 may dynamically request video game content from the content provision server 130 while the respective users 110, e.g. video game players, are playing the online connected game 122. For example, the video game may be configured such that music is requested from the content provision server 130 while the game is being played, where the request for music includes the current state of that instance of the online connected game, e.g. properties of the video game environment and the player character, may be included in the request to be used for deriving the video game content. For example, it may be desirable that the music depends on the player character's health and the number of enemies in their immediate vicinity, so these properties, or properties derived therefrom, may be included in the request.

The online connected game 122 may additionally or alternatively be configured to request video game content in response to a content request input by a player. For example, the online connected game 122 may include an apparel designer which players can use to design apparel for their in-game avatars. In the apparel designer, the player may select various desired properties of the apparel, e.g. the type of apparel, one or more colours and a style, then, based on these selections, the online connected game is configured to make a request including the desired properties for in-game apparel to the content provision server 130. In response to the request, the content provision server 130 provides video game content, e.g. a 3D mesh and a texture map, representing apparel with the desired properties, to the online connected game 122, and the online connected game 122 is configured to use the provided video game content to display the in-game avatar wearing the apparel with the desired properties.

The online connected game 122 may additionally or alternatively be configured to request video game content from the content provision server in response to accessibility feature(s) and/or mode(s) being enabled. For example, the online connected game 122 may include one or more accessibility feature(s) and/or mode(s) for facilitating playing of the video game by users with visual impairments. When these feature(s) and/or mode(s) are enabled, the online connected game may be configured to request the provision of speech audio based on text currently being displayed to or selected by a user 110 by a respective instance of the online connected game 122. For example, speech audio based on text included in a menu item currently being selected by a user 110 may be requested, or speech audio based on text at or proximate to a position of a pointer controlled by a user 110 may be requested.

The online connected game 122 may additionally or alternatively be configured to request video game content from the content provision server 130 to be utilized in the display of an in-game menu. For example, the online connected game 122 may be configured to request recommendations for player character choices and/or game modes from the content provision server 130 and highlight the recommended player character choices and/or game modes in the in-game menu. The recommendation request may include properties using which a recommendation may be made, e.g., the amount of time that the user has played various game modes for; the previous player character choices that the user has made; and/or the playstyle of the user, such as the actions taken by the user previously.

Each server 130, 140, 150 includes one or more processors (not shown), a memory (not shown) and a network interface (not shown). The processor(s) of each server execute suitable instructions stored in a computer-readable medium, e.g. memory. The network interface of each server is used to communicate with the other components of the system 100 to which the server is connected.

The content provision server 130 provides a request rate monitor 132, a request router 134, and a model instance initializer 136.

The request rate monitor 132 monitors a request rate of requests for video game content from the instances of the online connected game 122-1, 122-2, ..., 122-n. The request rate monitor may monitor the rate of requests by counting the number of requests received by the content provision server 130 within a specified amount of time. A formula for the request rate may be $N_r/T$, where $N_r$ is the number of requests received by the content provision server 130, and T is the period of time over which the requests are received.

The request rate of requests may also be a weighted request rate of requests, e.g. the request rate calculation may consider some requests to be equivalent to more than one request and/or some requests to be equivalent to less than one request. For example, the request rate may be calculated as:

$$\frac{\alpha N_s + \beta N_l}{T}$$

where $N_s$ is the number of short requests, e.g. requests expected to take less time and/or computational resources to process, received by the content provision server 130, $N_l$ is the number of long requests, e.g. requests expected to take more time and/or computational resources to process, received by the content provision server 130, and $\alpha$ and $\beta$ are weights, where $\alpha > \beta$.

Such weighted request rates may be particularly applicable where the request includes one or more variable length properties and the length of these one or more variable length properties affects the time taken to process the request. For example, where the request is a request for speech audio based on text included in the request, the length of this text, e.g. the number of characters, syllables or words in the text, may affect the amount of time taken to process the request. The request rate may be calculated based on the length of the text in each request. For example, the request rate may be calculated as:

$$\frac{\sum_{i=1}^{N_r} s_i}{P}$$

where $N_r$ is the number of requests, $s_i$ is the number of syllables in the text included in the ith request, and P is the period of time over which the requests are received.

The request router 134 receives requests, from instances of the online connected game 122, to provide video game content to the respective instance of the online connected game. The request may be received by the request router 134 from instances of the online connected game using any suitable mechanism, e.g. a REST call or a SOAP call; or a message queue.

The request may identify the type of video game content to be provided, e.g. where the content provision server 130 is usable to provide multiple types of video game content. The type of video game content identified could be, but is not limited to, the types of video game content described above, e.g. speech audio, music, non-player character behaviour, character animations, video game terrain, locations for entities in a video game environment.

The request may include input, and/or the input, or a part thereof, may have been sent, by the online connected game 122, to the content provision server 130 in an earlier operation or may be retrieved, e.g. from a game environment server, by the request router 134 or a content retrieval module (not shown). The input may include properties usable for providing the type of desired video game content. For example, the specified input may include desired traits of the video game content, e.g. for speech audio, the text to base the speech audio on. Alternatively or additionally, the specified input may include other data which the provided video game content is to depend on. For example, it may be desired that the video game content, e.g. music, depends on the current game state, e.g. the health of an in-game character, the location of the in-game character, and the number of enemies in the in-game character's immediate vicinity.

In response to the received request, the request router 134 requests an output from a selected instance of a selected one of the machine learning models 142. The selection of the instance and/or of the one of the machine learning models may be based on the request rate determined by the request rate monitor 132. Alternatively or additionally, the selection of the instance and/or of the one or more machine learning models 142 may be based on a number of requests queued for each of the respective instances and/respective machine learning models.

The selection of the instance and/or the one of the machine learning models may alternatively or additionally be based on an expected response time. For example, each of the machine learning models may have an expected response time associated with it, and the selection of the machine learning model may be based on this response time. The selection of the instance and/or the machine learning model may be based on a total expected response time for a given instance. This total expected response time may be calculated based on the expected response time for each machine learning model and the number of requests queued for each instance. The selected instance and/or the selected machine learning model may be selected as that having the lowest total expected response time. The total expected response time for each instance of each machine learning model may be calculated as the multiple of the number of requests queued for the respective instance of the respective machine learning model and the expected response time associated with the respective machine learning model, The total expected response time may be calculated according to the following formula, or a variant thereof:

$$T_{i,j} = q_{i,j} t_j$$

where $T_{i,j}$ is the total expected response time for the ith instance of the jth machine learning model, $q_{i,j}$ is the number of requests queued for the ith instance of the jth machine learning model, and $t_j$ is the expected response time associated with the jth machine learning model. At least some of these approaches may effectively load balance between the instances and the machine learning models, such load balancing may facilitate an approximately equal response time to each request and may alternatively or additionally reduce the likelihood that the load on any one instance of any one machine learning model is so great as to cause a failure of the instance.

Furthermore, as will be described in more detail in relation to FIG. 2 and FIG. 3, as the request rate increases, the model initializer 136 may initialize further instance(s) of one or more of the machine learning models 142, e.g. the model initializer may 'scale up' further instance(s) of one or more of the machine learning model(s). One of the initialized instance(s) may be selected and the output requested from the selected initialized instance. Alternatively, as initializing the instance(s) could take time, the output may be requested from another instance of one of the machine learning model(s), which could be selected according to one of the methods previously described. In this case, the initialized instance may be used for future requests.

If the request received by the request router 134 can be inputted to the selected machine learning model then the request router 134 may forward the received request to the selected machine learning model. Otherwise, the request router 134 processes the received request in order to derive one or more inputs based on the request that can be processed by the selected machine learning model, and communicates these inputs to the selected machine learning model. These one or more inputs can then be communicated to the machine learning model. For example, when speech audio is requested, the type of input processable by the selected machine learning model 142 may be a series of character embeddings, and the text in the request may be converted into suitable character embeddings by the request router 134.

In response to the inputting, by the request router 134, to the selected machine learning model, the request router 134 receives output from the selected machine learning model which is video game content or from which video game content can be derived. Where the request router 134 receives output from which video game content can be derived, the request router 134 processes the output to derive video game content. For example, in the case of speech audio, the machine learning model may return a series of spectrograms transformable into audio snippets. The content provision server 130 may transform the spectrograms into audio snippets, e.g. by transforming them from the frequency domain to the time domain, concatenate the audio snippets, and encode the resulting audio data in an appropriate file format. As another example, in the case of terrain generation, the machine learning model may output a terrain heightfield. The request router 134 may transform the terrain heightfield into a 3D mesh for the terrain.

The video game content is then provided to the respective instance of the online connected game 122 by the request router 134. Where different video game content is to be returned to different instances of the online connected game, e.g. based on properties and/or input included in the request, the request router 134 may store an association between requests and instances of the online connected game 122 such that the video game content is provided to the correct instance of the online connected game, e.g. the instance of the online connected game 122 that made the request including the properties and/or input.

The model initializer 136 initializes instance(s) of one or more of the machine learning models 142. The initialization of the instance(s) of certain of the one of the machine learning models may be in response to the request rate, as monitored by the request rate monitor 132, exceeding a threshold request rate. There may be multiple threshold request rates and the machine learning models 142 of which an instance is initialized may depend on which of these threshold request rates is exceeded. Examples of the initialization of instance(s) of one or more of the machine learning models are described in relation to FIG. 2 and FIG. 3.

The model initializer 136 may initialize instances of the machine learning model on one or more model hosting servers 150. The instance of the machine learning model may be initialized, e.g. executed, directly on the model hosting server 150. The model initializer 136 may initialize instance(s) of one or more of the machine learning models 142 by initializing a virtual machine and/or loading a container. The virtual machine and/or container may include the machine learning model. Containers may be loaded directly on a physical server. Containers may be loaded within a virtual machine, e.g. a virtual machine may be running already and/or may be initialized on a physical server and the container loaded in this virtual machine. The virtual machine(s) and/or container(s) to be loaded may be stored on model storage server 140.

The virtual machine and/or container and may contain an operating system, framework and/or libraries for hosting the machine learning model and the machine learning model may be loaded onto the virtual machine and/or container, e.g. from the model storage server 140. It may take time to initialize the virtual machine and/or load the container and/or the machine learning model, where not included in the container or virtual machine, so the machine learning model may not be available for use immediately.

Initializing instance(s) of the one or more machine learning models 142 may alternatively or additionally include dynamically allocating hardware resources on which to run the machine learning model. For example, the model hosting server(s) 150 may be one or more servers of a cloud computing service, and additional servers may be requested from the cloud computing service for hosting the instance(s) of the one or more machine learning model(s). These additional servers may be explicitly requested by the model instance initializer or may be implicitly requested. For example, the model instance initializer 136 may request the initialization of virtual machines and/or loading of containers by the cloud computing service, and the cloud computing service may determine that the currently allocated servers are not sufficient to efficiently host these virtual machines and/or containers, in addition to those already hosted, and, in response to this, may allocate more server(s) to host these virtual machines and/or containers.

The model storage server 140 may be one or more servers suitable for storing files, folders and/or database records. For example, the server(s) may be file server(s), database server(s) and/or servers providing binary large object (BLOB) storage. These model storage server(s) may be provided by a cloud computing service.

The model storage server 140 stores a plurality of machine learning models 142. For example, the machine learning models 142 may be stored on the machine learning model storage server 140 using a representation of the parameters, e.g. weights and/or structure of the machine learning model, e.g. the machine learning models 142 may be stored in neural network exchange format(s) and/or framework-specific format(s). The machine learning models 142 may alternatively or additionally be stored as code, e.g. one or more text-based code files and/or as compiled executable code. The machine learning models 142 may be stored on the model storage server as part of a container and/or virtual machine which includes the operating system, framework and/or libraries used to host the respective machine learning model.

The plurality of machine learning models 142 stored on the model storage server 140 may include one or more machine learning models produced by a model derivation process to both have a faster response time compared to a principal machine learning model and to approximate the output of the principal machine learning model. For example, for a given input, the derived machine learning model(s) may produce approximately the same output as the principal machine learning model and/or may produce the same output for the same input a high percentage, e.g. 90-99%, of the time. For example, a derived machine learning model for recommending game mode(s) may recommend the same game mode(s) as the principal machine learning model a high percentage, e.g. 90-99%, of the time. One or more of the derived machine learning model(s) may use less storage than the principal machine learning model. These lower storage requirements may contribute to the faster response time compared to the principal machine learning model as allocating storage and/or memory for a machine learning model takes time, so machine learning models having lower storage requirements may be quicker to initialize. For example, it may be quicker to initialize a virtual machine and/or load a container including models having lower storage requirements Derived machine learning models may be produced from the principal machine learning model itself using the model derivation process and/or may be produced from another one of the derived machine learning models, e.g. there may be first generation derived models produced from the principal machine learning model and second generation derived models produced from the first generation derive models. Examples of model derivation processes include pruning one or more weights, trained ternary quantization, model distillation, and deep compression, which includes pruning, ternary quantization and Huffman coding. The derived machine learning models may have been derived using the systems and/or methods described in relation to FIG. 4 and/or FIG. 5.

The principal machine learning model may be the machine learning model 142-1, and the others of the machine learning models 142-2, . . . , 142-x may have been produced based on this model using a derivation process. However, the principal machine learning model may also be a different machine learning model (not shown) than those stored on the model storage server 140. The principal machine learning model may be a model that is significantly larger and/or has a significantly higher response time than those stored on the model storage server such that it is impractical to use and/or store. Alternatively or additionally, one or more of the derived machine learning models may be found to be more performant, e.g. have a higher value of a performance metric as evaluated using test data, than the principal machine learning model. The machine learning model 142-1 may also be a derived machine learning model, e.g. all of the machine learning models 142-1, 142-2, . . . , 142-x may be derived machine learning models.

The model hosting server 150 hosts the instances of the machine learning models 142-1-1, . . . , 142-x-k. The instances of the machine learning models may have been initialized by model instance initializer 136 as previously described. Each or several of the instance of the machine learning models may be hosted directly on physical servers. Each or several of the instances of the machine learning models may be hosted on one or more virtual machines and/or in one or more containers. These virtual machine(s) and/or container(s) may facilitate isolation of the instances of the machine learning models, e.g. reduce the likelihood that the failure of one instance of a machine learning model affects the operation of another machine learning model. Using virtual machine(s) and/or container(s) also facilitates easy scaling of the instances of a machine learning model, e.g. new virtual machines and/or containers for hosting a machine learning model instance may be easily initialized, e.g. scaled up. The model hosting server(s) 150 may be one or more servers of a cloud computing service, and additional servers of the cloud computing service may be allocated on demand, e.g. based on the initialization of one or more of the instances of the machine learning model.

In the example shown, the model hosting server 150 is hosting i instances of a first machine learning model 142-1, which is the most performant, e.g. produces the best output, but has the highest response time, j instances of a second machine learning model 142-2, which is less performant, e.g. produces worse output, than the first machine learning model 142 but has a lower response time, and k instances of an xth machine learning model, which is the least performant but has the lowest response time. In addition, as indicated by the ellipsis, ' . . . ', in the figure, the model hosting server may host further instances of further machine learning models having performances and response times between that of the second machine learning model and the xth machine learning model.

Derived Machine Learning Model Instance Auto-Scaling

Figure 2:
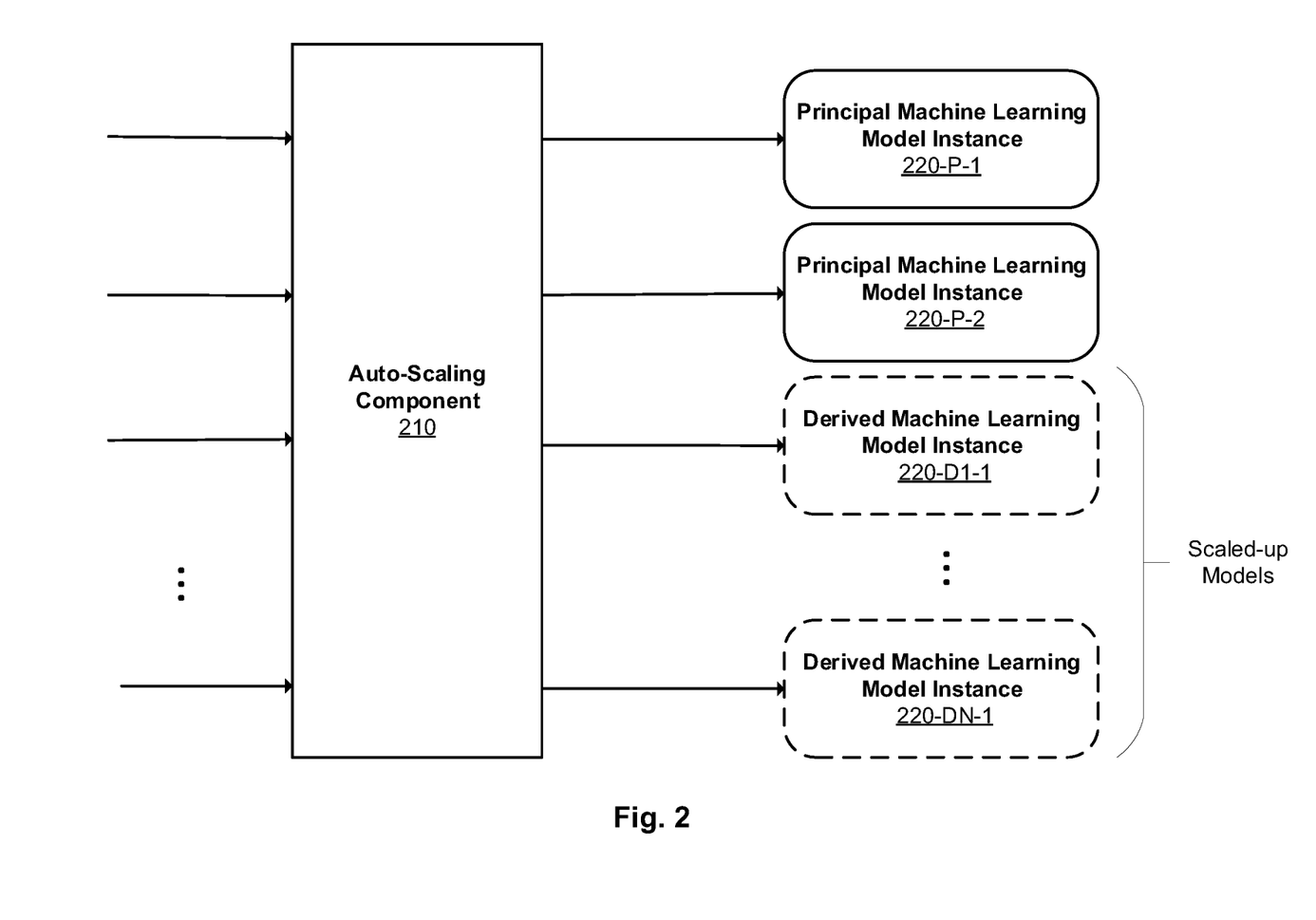
FIG. 2 is a schematic block diagram illustrating the auto-scaling of instances of derived machine learning models.

Referring to FIG. 2, a schematic block diagram illustrating the auto-scaling of derived machine learning model instances in a computer system configured to provide video game content is shown.

The diagram illustrates an auto-scaling component 210, e.g. content provision server 130 or a part thereof, receiving a plurality of requests for video game content and scaling up, e.g. initializing, instances of derived machine learning models 220-D1-1, . . . , 220-DN-1 in response to the rate at which these requests are received.

Initially two instances 220-P-1, 220-P-2 of a principal machine learning model 220-P are hosted and requests for video game content are routed by the auto-scaling component 210 to one of these instances of the principal machine learning 220-P.

In response to a request rate of the requests being received by the auto-scaling component 210 exceeding a first threshold request rate, one or more instances 220-D1-1 of a first derived machine learning model having a faster response time than the principal machine learning model 220-P are scaled up, e.g. initialized. At least some of the received requests and/or subsequently received requests are routed to these one or more instances 220-D1-1 of the first derived machine learning model 220-D1.

In response to the request rate of the requests being received by the auto-scaling component 210 being less than the first threshold request rate, at least one of, optionally all of, the one or more instances 220-D1-1 of the first derived machine learning model 220-D1 may be scaled down, e.g. terminated.

Alternatively or additionally, a first scale-down threshold request rate that is different from the first threshold request rate may be used. In response to the request rate of requests being received by the auto-scaling component being less than the first scale-down request rate, at least one of, optionally all of, the one or more instances 220-D1-1 of the first derived machine learning model 220-D1 may be scaled down, e.g. terminated. The first scale-down threshold request rate may be less than the first threshold request rate. By using a first scale-down threshold request rate that is less than the first threshold request rate for scaling up, scaling down and subsequent (re)scaling up of instances may be reduced compared to using the first threshold request rate for both scaling up and scaling down. This reduction may be particularly significant where the request rate of the requests is approximate to the first threshold request rate and/or fluctuates around the first threshold request rate.

In response to a request rate of the requests being received by the auto-scaling component 210 exceeding an Nth threshold request rate that is greater than the first threshold request rate (e.g. a second or subsequent threshold), one or more instances 220-DN-1 of an Nth derived machine learning model 220-DN having a faster response time than the first derived machine learning model are scaled up, e.g. initialized. At least some of the received requests and/or subsequently received requests are routed to these one or more instances 220-DN-1 of the Nth derived machine learning model 220-DN.

In response to the request rate of the requests being received by the auto-scaling component 210 being less than the Nth threshold request rate, at least one of, optionally all of, the one or more instances 220-DN-1 of the Nth derived machine learning model 220-DN may be scaled down, e.g. terminated. Alternatively or additionally, as described in relation to the first derived machine learning model, an Nth scale-down threshold request rate that is different from the Nth threshold request rate may be used.

As indicated by the ellipsis, ' . . . ', in the figure, in response to the request rate of the requests being received exceeding a kth threshold request rate, where $1<k<N$, where the kth threshold request rate is greater than the first threshold request rate but is less than the Nth threshold request rate, one or more instances of a kth derived machine learning model may be scaled up, e.g. initialized.

In response to the request rate of the requests being received by the auto-scaling component 210 being less than the kth threshold request rate, at least one of, optionally all of, the one or more instances of the kth derived machine learning model 220-DN may be scaled down, e.g. terminated. Alternatively or additionally, as described in relation to the first derived machine learning model and the Nth derived machine learning model, a kth scale-down threshold request rate that is different from the kth threshold request rate may be used.

Video Game Content Provision Method

Figure 3:
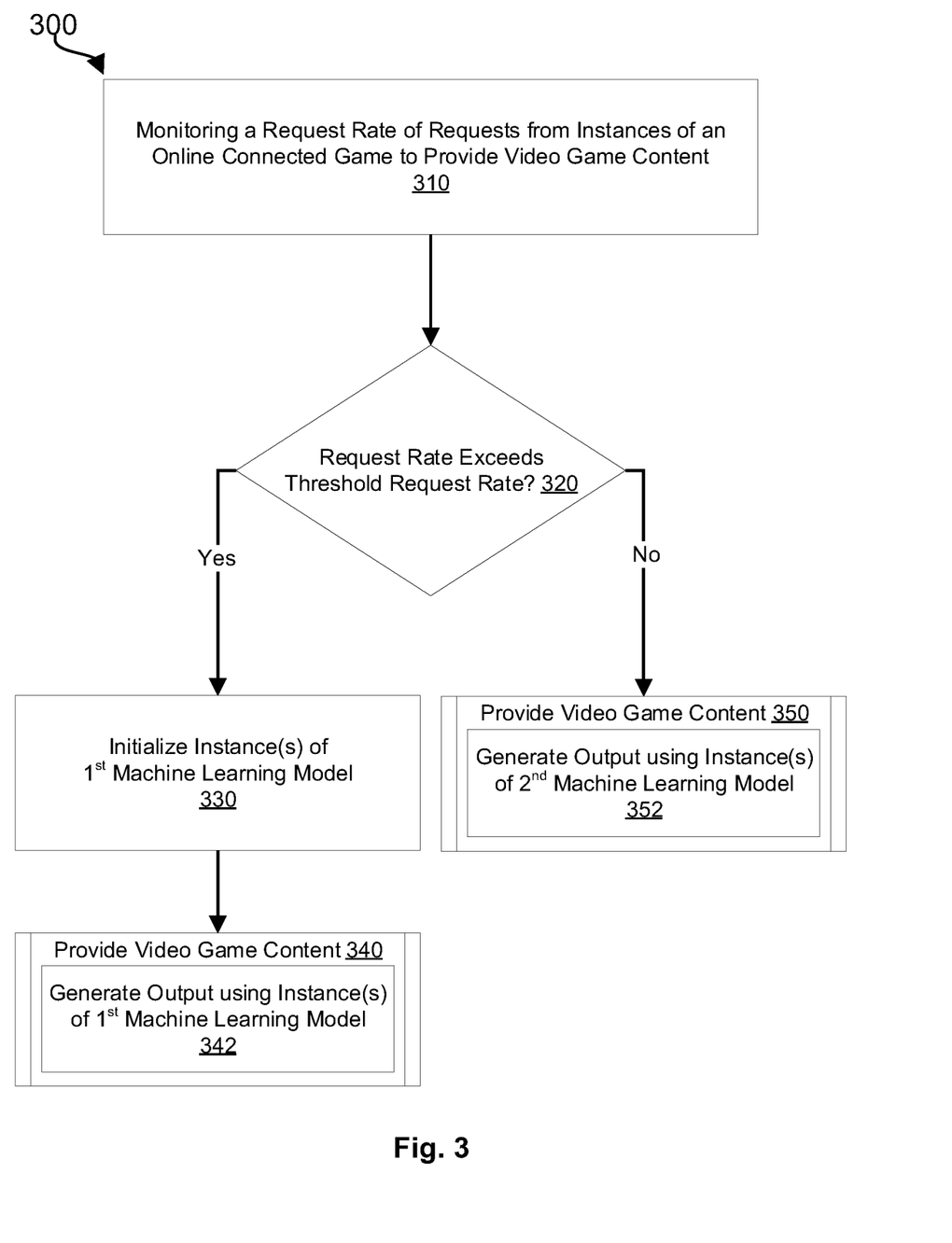
FIG. 3 is a flow diagram of an example method for providing video game content using one or more derived machine learning models.

FIG. 3 is a flow diagram of an example method 300 for providing video game content. The method may be performed by executing computer-readable instructions using one or more processors of one or more computing devices, e.g. one or more computing devices of the video game content provision system 100.

In step 310, a request rate of requests to provide video game content based on specified input is monitored. The requests are received from a plurality of instances of an online connected game. The request rate monitor may monitor the rate of requests by counting the number of requests received within a specified amount of time. A formula for the request rate may be $N_r/T$, where $N_r$ is the number of requests received, and P is the period of time over which the requests are received.

The request rate of requests may also be a weighted request rate of requests, e.g. the request rate calculation may consider some requests to be equivalent to more than one request and/or some requests to be equivalent to less than one request. For example, the request rate may be calculated as:

$$\frac{\alpha N_s + \beta N_l}{P}$$

where $N_s$ is the number of short requests received, e.g. requests expected to take less time and/or computational resources to process, $N_l$ is the number of long requests received, e.g. requests expected to take more time and/or computational resources to process, and $\alpha$ and $\beta$ are weights, where $\alpha > \beta$.

Such weighted request rates may be particularly applicable where the request includes one or more variable length properties and the length of these one or more variable length properties affects the time taken to process the request. For example, where the request is a request for speech audio based on text included in the request, the length of this text, e.g. the number of characters, syllables or words in the text, may affect the amount of time taken to process the request. The request rate may be calculated based on the length of the text in each request. For example, the request rate may be calculated as:

$$\frac{\sum_{i=1}^{N_r} s_i}{P}$$

where $N_r$ is the number of requests, $s_i$ is the number of syllables in the text included in the ith request, and P is the period of time over which the requests are received.

In step 320, it is determined whether the request rate of the requests exceeds a threshold request rate. In response to the request rate exceeding the threshold request rate, the step 330 may be performed. In response to the request rate not exceeding the threshold request rate, e.g. being less than or equal to the threshold request rate, the step 350 may be performed. The threshold request rate may be a static value, e.g. a value set by a system developer or maintainer, or the value may be dynamically determined. For example, the threshold request rate may be based on a number of requests currently queued, a current expected response time of one or more instances of one or more machine learning models for processing the request, and/or a total expected response times for one or more instances of one or more machine learning models. For example, the threshold request rate may be based on the average total expected response time across each of the instances of each of the machine learning models.

In step 330, one or more instances of a first machine learning model are initialized. The first machine learning model is configured to provide an output which is approximate to the output of a second machine learning model. The first machine learning model may have been derived from the second machine learning model. The first machine learning model may have been produced by a model derivation process to have a faster response time compared to the second machine learning model. For example, the second machine learning model may have a response time of one second and the first machine learning model may have a response time of 0.2 seconds.

For example, for a given input, the first machine learning model may produce approximately the same output as the second machine learning model and/or may produce the same output for the same input a high percentage, e.g. 90-99%, of the time. For example, the first machine learning model for recommending game mode(s) may recommend the same game mode(s) as the second machine learning model a high percentage, e.g. 90-99%, of the time. For example, the first machine learning model may be approximately 10% less accurate than the second machine learning model.

The second machine learning model may use less storage than the first machine learning model. These lower storage requirements may contribute to the faster response time compared to the second machine learning model as allocating storage and/or memory for a machine learning model takes time, so machine learning models having lower storage requirements may be quicker to initialize. For example, it may be quicker to initialize a virtual machine and/or load a container including models having lower storage requirements.

The first machine learning model may have been produced from the second machine learning model itself using the model derivation process and/or may have been produced from another machine learning model which has itself been derived from the second machine model, e.g. there may be a first generation derived model produced from the second machine learning model and the first machine learning model may have been produced from this first generation derived model. Examples of model derivation processes include pruning one or more weights, trained ternary quantization, model distillation, and deep compression, which includes pruning, quantization and Huffman coding. The derived machine learning models may have been derived using the systems and/or methods described in relation to FIG. 4 and/or FIG. 5.

The one or more instance(s) of the first machine learning model may be initialized by initializing a virtual machine and/or loading a container. The virtual machine and/or container may include the first machine learning model. Containers may be loaded directly on a physical server. Containers may be loaded within a virtual machine, e.g. a virtual machine may be running already and/or may be initialized on a physical server and the container loaded in this virtual machine. The virtual machine and/or container and may contain an operating system, framework and/or libraries for hosting the machine learning model and the first machine learning model may be loaded onto the virtual machine and/or container. It may take time to initialize the virtual machine and/or load the container and/or the first machine learning model, where not included in the container or virtual machine, so the first machine learning model may not be available for use immediately.

Initializing the one or more instances of the first machine learning model may alternatively or additionally include dynamically allocating hardware resources on which to run the first machine learning model. For example, additional servers may be requested from a cloud computing service for hosting the one or more instance(s) of the first machine learning model. These additional servers may be explicitly requested by the model instance initializer or may be implicitly requested.

In step 340, video game content is provided to at least one of the plurality of instances of the connected game. The type of video game content provided could be, but is not limited to, the types of video game content described above, e.g. speech audio, game mode recommendations, player character choice recommendations, music, non-player character behaviour, character animations, video game terrain, and locations for entities in a video game environment.

The step 340 includes a step 342 of generating an output responsive to the specified input with the first machine learning model. To generate the output, one or more inputs may have to be made to the first machine learning model. If the specified input is itself processable by the first machine learning model, the specified input may itself be input to this machine learning model. However, in some cases, the specified input may not itself be processable by the first machine learning model. In this case, the specified input is processed in order to derive one or more inputs based on the specified input that can be processed by the first machine learning model, and these derived one or more inputs are inputted to the first machine learning model. For example, when speech audio is requested, the type of input processable by the first machine learning model may be a series of character embeddings, and the text in the specified input may be converted into suitable character embeddings.

The appropriate input may then be processed by the first machine learning model to generate an output. The generated output may itself be the video game output to be provided, or may be an output from which video game can be derived. Therefore, the step 340 of providing the video game content may further include deriving the video game content from the generated output. For example, in the case where the video game content is speech audio, and the generated output may be a series of spectrograms. The series of spectrograms may be converted into speech audio by transforming each of them from the frequency domain to the time domain to derive audio snippets, concatenating the audio snippets, and encoding the resulting audio data in an appropriate file format. As another example, in the case of terrain generation, the generated output may be a terrain heightfield and the video game content derived from it may be a 3D mesh for the terrain.

In step 350, which may be executed if the request rate threshold is not exceeded, video game content is provided to at least one of the plurality of instances of the connected game. The type of video game content provided could be, but is not limited to, the types of video game content described above. The step 350 includes a step 352 of generating an output responsive to the specified input with the second machine learning model. The steps 350 and 352 operate in the same or a substantially similar manner to steps 340 and 342, but the second machine learning model rather than the first machine learning model is utilized.

Where the threshold request rate does not exceed the threshold request rate but exceeds a (lower) intermediate threshold request rate, a new instance of the second machine learning model may be initialized. This new instance of the second machine learning model may be utilized to provide video game content as previously described. If the request rate does not exceed this intermediate threshold request rate, existing instance(s) of the second machine learning model may be utilized for providing the video game content.

Machine Learning Model Derivation System

Figure 4:
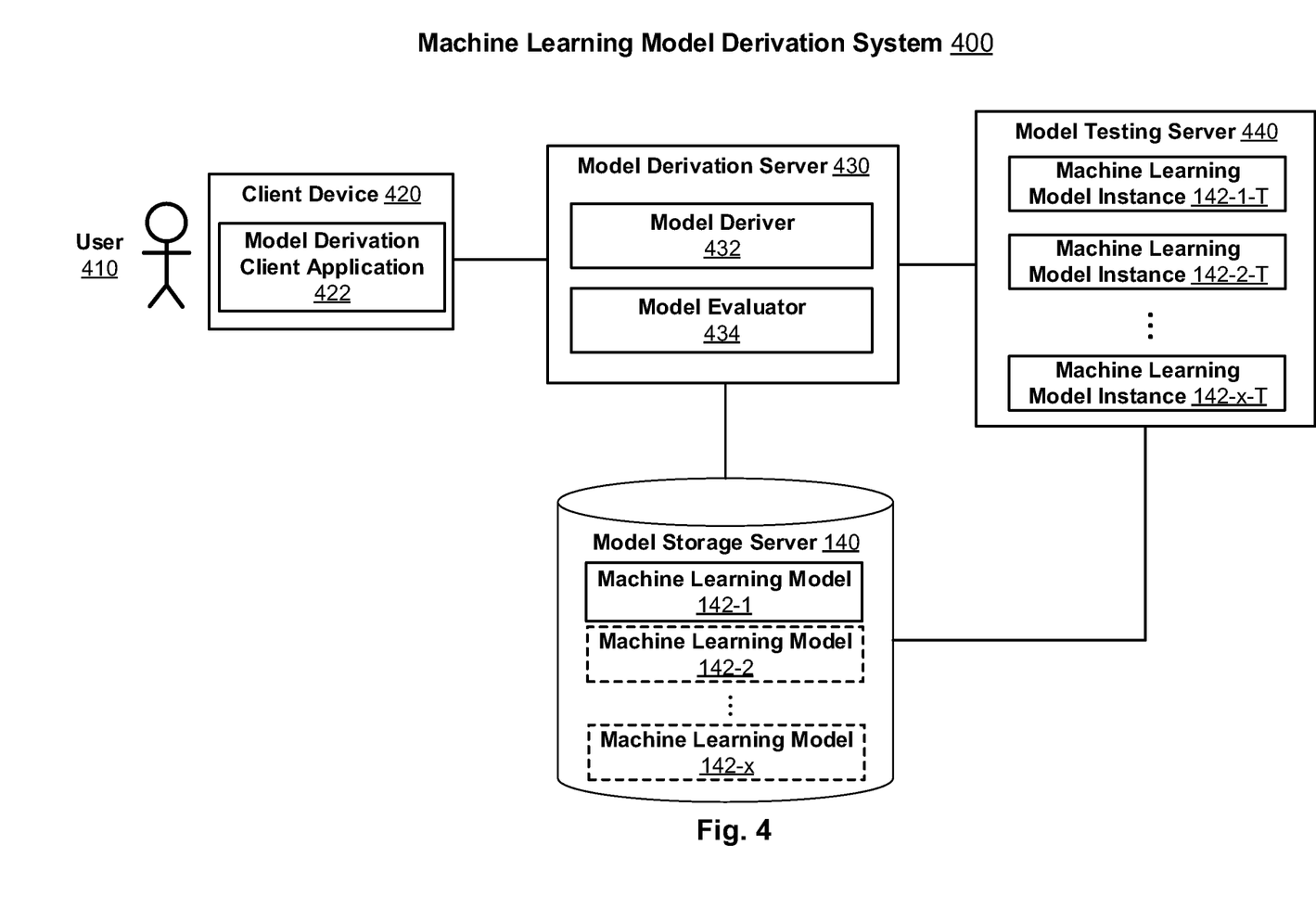
FIG. 4 is a schematic block diagram illustrating an example of a computer system configured to derive machine learning models from a submitted machine learning model.

Referring to FIG. 4 is a machine learning model derivation system 400 for deriving machine learning models from a submitted machine learning model is shown.

The machine learning model derivation system 400 include client computing device 420 operable by a user, model derivation server 430, the model storage server 140 and model testing server 440. The client computing device 420 is configured to communicate with the model derivation server 430 over a network. Similarly, the model derivation server 430 is configured to communicate with the model storage server 140 over the same or another network. The model derivation server 430 is also configured to communicate with the model testing server 440 over the same or another network. The model testing server 440 may also be configured to communicate with the model storage server 140. Examples of suitable networks include the internet, intranets, virtual private networks, local area networks, private wide area networks, wireless networks and cellular networks. For the sake of clarity, the machine learning model derivation system 400 is illustrated as comprising a specific number of devices. Any of the functionality described as being performed by a specific device may instead be performed across a number of computing devices, and/or functionality described as being performed by multiple devices may be performed on a single device. For example, multiple instances of the model derivation server 430, the model testing server 440, and/or model storage server 140 may be hosted as virtual machines or containers on one or more computing devices of a public or private cloud computing environment.

The client computing device 420 can be any computing device suitable for submitting a machine learning model to the model derivation server 430 or suitable for causing a machine learning model to be submitted to the model derivation server 430. For example, the client computing device 420 may be any of a desktop computer, a laptop computer or a smartphone. For displaying a model derivation client application 422 to the user 410, the client computing device 420 includes or is connected to a display (not shown). Input device(s) (not shown) are also included or connected to the client computing device 420. Examples of suitable input devices include keyboards, touchscreens and mice.

The model derivation client application 422 provides functionality whereby the user 410 may submit or cause the submission of a machine learning model to the model derivation server 430. For example, the model derivation client application 422 may provide a graphical user interface where the user 410 can select the machine learning model to be submitted, e.g. by selecting a data item, such as a file, BLOB, or database record, representing the machine learning model, where this data item is located on the client device 420 or on the model storage server 140. The model derivation client application 422 may also include functionality for selecting which one or more model derivation processes should be applied to the submitted machine learning model by the model derivation server 430 to produce derived machine learning models, e.g. checkboxes in a graphical user interface where the user 410 can check the derivation processes to be used. Subsequent to the production of one or more derived machine learning models and the evaluation of these one or more derived machine learning models by the model derivation server, the model derivation client application 422 may receive evaluation results, e.g. respective values of a performance metric and latency values, and display them to the user 410.

Each server 430, 440 includes one or more processors (not shown), a memory (not shown) and a network interface (not shown). The processor(s) of each server execute suitable instructions stored in a computer-readable medium, e.g. memory. The network interface of each server is used to communicate with the other components of the system 100 to which the server is connected.

The model derivation server 430 provides a model deriver 432 and a model evaluator 434.

The model deriver 432 produces one or more derived machine learning models from a submitted machine learning model using a machine learning model derivation process. The model deriver 432 may receive the submitted machine learning model from the model derivation client application 422, or an indicator of the location of the submitted machine learning model may be received from the client application and the submitted machine learning model loaded from the specified location. For example, the submitted machine learning model may be the machine learning model 142-1 stored on the model storage server 140 and an indicator of the location of this model, e.g. a model name or file path, may have been included in a request from the model derivation client application.

The derived machine learning models produced using the machine learning model derivation processes may approximate the output of the submitted machine learning model while having a faster response time than the submitted machine learning model. Examples of model derivation processes that the model deriver 432 may use to produce the one or more derived machine learning models include pruning one or more weights, trained ternary quantization, model distillation, and deep compression, which includes pruning, quantization and Huffman coding. Pruning one or more weights refers to eliminating parameters in a machine learning model, such as weights in a neural network model. In a neural network context, pruning may involve setting small weights in a neural network to zero as to effectively eliminate connections between layers of the neural network. For example, weights which are below a threshold value and/or the smallest K weights in the neural network may be set to zero. Trained ternary quantization is a process whereby ternary (2-bit) values and per layer scaling coefficients are used for weights in place of fixed point or floating point numbers having more bits, e.g 0.32-bit or 64-bit fixed point numbers. Model distillation is a process whereby a simpler machine learning model, e.g. a neural network having fewer layers, is trained to approximate the input of a more complex machine learning model, e.g. a neural network having more layers. Deep compression is a three-stage pipeline that can be applied to neural networks that includes pruning connections in the neural networks, quantization of the weights to enforce weight sharing, and applying Huffman coding to the quantized weights. This process may substantially reduce the storage requirements and response time of a neural network substantially.

The machine learning models produced using the model derivation process(es) may be stored on the model storage server 140. For example, the derived machine learning models 142-2, . . . , 142-x may not initially have been present on the model storage server 140 but may have been produced and stored on the model storage server by the model deriver 432.

The model evaluator 434 may evaluate the derived machine learning models, e.g. machine learning models 142-2, . . . , 142-x. The model evaluator 434 may evaluate each of the derived machine learning models by initializing an instance the respective derived machine learning model on the model testing server 440 and causing test outputs to be generated by the respective machine learning model, e.g. by inputting a series of test inputs to the respective machine learning model, determining a value of a performance metric based on these test outputs, and determining a latency value for the respective derived machine learning model, e.g. by calculating an average time that the respective derived machine learning model took to produce an output. The model evaluator 434 may send the evaluation results, e.g. the determined performance metric values and latency values, to the model derivation client application 422.

The model testing server 440 hosts the testing instances of the machine learning models 142-1-T, . . . , 142-x-T. The instances of the machine learning models may have been initialized by the model evaluator 434 as previously described. As described in relation to the model hosting server 150, the machine learning model instances may be hosted directly on physical servers, on virtual machines and/or using containers.

Model Derivation and Evaluation Method

Figure 5:
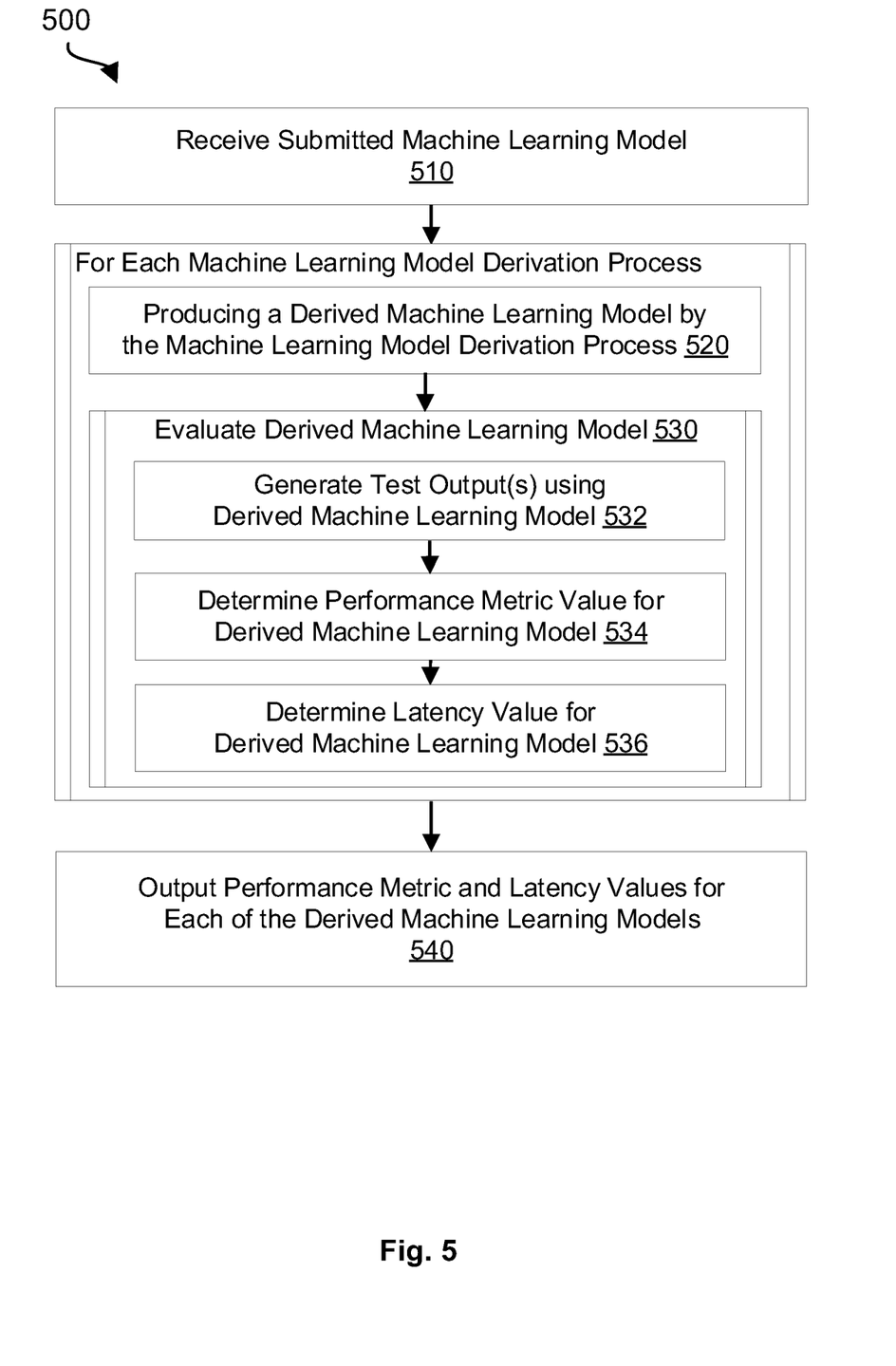
FIG. 5 is a flow diagram of an example method for deriving machine learning models from a submitted machine learning model and evaluating the derived machine learning models.

FIG. 5 is a flow diagram of an example method for deriving machine learning models from a submitted machine learning model and evaluating the derived machine learning models. The method may be performed by executing computer-readable instructions using one or more processors of one or more computing devices, e.g. one or more computing devices of the machine learning model content provision system 400.

In step 510, a submitted machine learning model is received. The submitted machine learning model may have been received from a client or an indicator of a location of the submitted machine learning model may have been received from a client and the submitted machine learning model received, e.g. retrieved, from the indicated location.

For each of one or more machine learning model derivation processes, the steps 520 and 530 are performed.

In step 520, a derived machine learning model is produced using the respective machine learning model derivation process. Examples of model derivation processes include pruning one or more weights, trained ternary quantization, model distillation, and deep compression, which includes pruning, quantization and Huffman coding. These techniques are described in greater detail in relation to the model deriver 432 of machine learning model derivation system 400.

In step 530, the respective derived machine learning model is evaluated. For the respective derived machine learning model to be evaluated, an instance of the respective derived machine learning model may be initialized.

Evaluating the respective derived machine learning model includes a step 532 of generating test outputs using the respective derived machine learning model. These generated test outputs may be video game content or outputs from which video game content may be derived, e.g. phonemes and/or spectrogram frames for speech audio, a terrain heightfield for use in generating a 3D mesh for an in-game terrain, or latent embeddings of the video game content. There may be a pair of a test input and a ground-truth output, of the same type as the test output, associated with each of the test outputs. These pairs of a test input and a ground-truth output may be referred to as test pairs and may be collectively referred to as the test set. The test outputs may be generated by inputting the test input of each of the test pairs to the respective derived machine learning model.

Evaluating the respective derived machine learning model further includes a step 534 of determining a value of a performance metric for the respective derived machine learning model based on the test outputs. The performance metric value may directly or indirectly measure the quality of the video game content which can be provided using these outputs. Where test pairs including a test input and a ground-truth output have been used to generate the test outputs, calculating the performance metric may include calculating a measure of the difference between the respective test output and the ground-truth output. The measure may be a loss function, or a component thereof, used for training the respective derived machine learning model and/or the submitted machine learning model. However, it may also be a non-loss function measure, e.g. a non-differentiable measure. The performance metric may be a summary of these values across the test set, and the performance metric may be non-differentiable. For example, the performance metric may be a sum or average of the measures for each test pair.

Evaluating the respective derived machine learning model further includes a step 536 of determining a latency value, e.g. a response time value, for the respective derived machine learning model. Determining the latency value may include monitoring the amount of time that the respective derived machine learning model takes to produce each test output. The latency value or a component thereof may be calculated as the sum or average of the amount of time taken to produce each of the test outputs.

In step 540, the performance metric and latency values for each of the derived machine learning models are output. For example, the performance metric values and latency values may be sent to a client application for display to a user. Alternatively or additionally, the performance metric and/or latency values may be stored in one or more files and/or databases. Further statistics may also be output, e.g. statistics from which the performance metric and latency values were derived or statistic derived therefrom. These statistics may include a performance metric value for each of the test outputs, a standard deviation of the performance metric value, the latency value for each of the test outputs, a standard deviation of the latency value.

An example computer-implemented method for producing and evaluating machine learning models for providing video game content includes: receiving a submitted machine learning model, and, for each of one or more machine learning model derivation processes, producing a respective machine learning model using the machine learning model derivation process. The example method further includes evaluating each of the derived machine learning models. Evaluating each of the derived machine learning models includes: generating one or more test outputs using the derived machine learning model; determining, based on the one or more test outputs, a value of a performance metric for the derived machine learning model; and determining a latency value for the derived machine learning value. The example method further includes outputting the value of the performance metric and the latency value for each of the derived machine learning models.

An example distributed computing system for deriving and evaluating machine learning models for providing video game content includes a plurality of servers. The example distributed computing system is configured to: receive a submitted machine learning model, and, for each of one or more machine learning model derivation processes, produce, a respective machine learning model using the machine learning model derivation process. The example distributed computing system is further configured to evaluate each of the derived machine learning models. Evaluating each of the derived machine learning models includes: generating one or more test outputs using the derived machine learning model; determining, based on the one or more test outputs, a value of a performance metric for the derived machine learning model; and determining a latency value for the derived machine learning value. The example distributed computing system is further configured to output the value of the performance metric and the latency value for each of the derived machine learning models.

An example of one or more non-transitory computer readable media stores computer program code. When executed by one or more processing devices, the computer program code causes the one or more processing devices to perform operations including: receiving a submitted machine learning model; for each of one or more machine learning model derivation processes, producing a respective machine learning model using the machine learning model derivation process, evaluating the derived machine learning model, which includes generating one or more test outputs using the derived machine learning model and determining, based on the one or more test outputs, a value of a performance metric for the derived machine learning modem and determining a latency value for the derived machine learning value, outputting the value of the performance metric and the latency value for the derived machine learning model.

In the above description, numerous details are set forth. It will be apparent, however, to one of ordinary skill in the art having the benefit of this disclosure that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulation of physical quantities. Usually, though not necessarily, these quantities take the form of electrical or magnetic signals capable of being stored, transferred, combined, compared and otherwise manipulated. It has been proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," "reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purpose, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMS and magnetic-optical disks, read-only memories (ROMs), random access memories (RAMs), EPROMs, magnetic or optical cards, flash memory, or any type of media suitable for storing electronics instructions.

The words "example" or "exemplary" are used herein to mean serving as an example, instance, or illustration. Any aspect or design described herein as "example" or "exemplary" is not necessarily to be construed as preferred or advantageous over other aspects of designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" in intended to mean any of the natural inclusive permutations. That is, if X includes A; X includes B; or X includes both A and B, then "X includes A and B" is satisfied under any of the foregoing instances. In addition, the articles "a" and "an" as used in this specification and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinary meaning according to their numerical have a ordinal meaning according to their numerical designation.

The algorithms and displays presented herein presented herein are inherently related to any particular computer or other apparatus. Various general purpose systems may be used with programs in accordance with the teachings herein, or it may prove convenient to construct a more specialized apparatus to perform required method steps. The required structure for a variety of these systems will appear from the description. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or method are not described in detail or are presented in simple block diagram format in order to avoid unnecessarily obscuring the present disclosure. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

The invention claimed is:

1. A computer-implemented method for providing video game content to an online connected game, comprising:
monitoring, by at least one processor, a request rate of requests to provide video game content based on specified input, wherein the requests are received from a plurality of instances of the online connected game;
in response to the request rate exceeding a threshold request rate:
initializing, by the at least one processor, at least one instance of a first machine learning model, wherein the first machine learning model is configured to provide an output which is approximate to the output of a second machine learning model from which the first machine learning model is derived, the first machine learning model being produced by a model derivation process to have a faster response time compared to the second machine learning model; and
providing, by the at least one processor, first video game content to at least one of the plurality of instances of the online connected game, wherein providing the first video game content comprises generating a first output responsive to the specified input using the at least one instance of the first machine learning model; and,
in response to the request rate not exceeding the threshold request rate:
providing, by the at least one processor, second video game content to the at least one of the plurality of instances of the online connected game, wherein providing the second video game content comprises generating a second output responsive to the specified input using at least one instance of the second machine learning model.

2. The method of claim 1, further comprising:
in response to the request rate exceeding an additional threshold request rate, wherein said additional threshold request rate is greater than the threshold request rate:
initializing at least one instance of a third machine learning model, wherein the third machine learning model is configured to provide an output which is approximate to the output of the second machine learning model, the third machine learning model being produced by the model derivation process to have a faster response time compared to the first machine learning model,
providing video game content to at least one of the plurality of instances of the online connected game, wherein providing the video game content comprises generating an output responsive to the specified input using the at least one instance of the third machine learning model.

3. The method of claim 1, further comprising, in response to the request rate being less than the threshold request rate, terminating at least one of the at least one instance of the first machine learning model.

4. The method of claim 1, further comprising, in response to the request rate being less than another threshold request rate, terminating at least one of the at least one instance of the first machine learning model.

5. The method of claim 1, further comprising performing the model derivation process to produce the first machine learning model from the second machine learning model.

6. The method of claim 1, wherein the model derivation process comprises compressing the second machine learning model to generate the first machine learning model.

7. The method of claim 1, wherein the model derivation process comprises pruning one or more weights from the second machine learning model.

8. The method of claim 1, wherein the model derivation process comprises trained ternary quantization.

9. The method of claim 1, wherein the model derivation process comprises Huffman coding.

10. The method of claim 1, wherein the model derivation process comprises model distillation.

11. The method of claim 1, wherein the second machine learning model is a baseline machine learning model.

12. The method of claim 1, wherein initializing the at least one instance of the first machine learning model comprises launching at least one virtual machine instance.

13. The method of claim 1, wherein initializing the at least one instance of the first machine learning model comprises running one or more containers.

14. The method of claim 1, wherein the provided video game content comprises speech audio.

15. The method of claim 14, wherein the speech audio is generated based on text displayed by the online connected game.

16. The method of claim 1, wherein the provided video game content comprises music.

17. A distributed computing system for providing video game content to an online connected game, comprising a plurality of servers, wherein the distributed computing system is configured to:

monitor a request rate of requests to provide video game content based on specified input, wherein the requests are received from a plurality of instances of the online connected game;

in response to the request rate exceeding a threshold request rate:
  initialize at least one instance of a first machine learning model, wherein the first machine learning model is configured to provide an output which is approximate to the output of a second machine learning model from which the first machine learning model is derived, the first machine learning model being produced by a model derivation process to have a faster response time compared to the second machine learning model; and
  provide first video game content to at least one of the plurality of instances of the online connected game, wherein providing the first video game content comprises generating a first output responsive to the specified input using the at least one instance of the first machine learning model, and in response to the request rate not exceeding the threshold request rate:
  provide second video game content to the at least one of the plurality of instances of the online connected game, wherein providing the second video game content comprises generating a second output responsive to the specified input using at least one instance of the second machine learning model.

18. The distributed computing system of claim 17, further comprising a plurality of client devices, wherein each of the plurality of client devices is configured to execute an instance of the online connected game, wherein executing an instance of the online connected game comprises:

sending, to at least one of the plurality of servers, a request to provide video game content; and receiving, from at least one of the plurality of servers, the video game content responsive to the request.

19. One or more non-transitory computer readable storage media storing computer program code that, when executed by one or more processing devices, cause the one or processing devices to perform operations comprising:

monitoring a request rate of requests to provide video game content based on specified input, wherein the requests are received from a plurality of instances of an online connected game;

in response to the request rate exceeding a threshold request rate:
  initializing at least one instance of a first machine learning model, wherein the first machine learning model is configured to provide an output which is approximate to the output of a second machine learning model from which the first machine learning model is derived, the first machine learning model being produced by a model derivation process to have a faster response time compared to the second machine learning model; and
  providing video game content to at least one of the plurality of instances of the online connected game, wherein providing the video game content comprises generating an output responsive to the specified input using the at least one instance of the first machine learning model; and in response to the request rate being less than the threshold request rate:
  terminating at least one of the at least one instance of the first machine learning model.

\* \* \* \* \*